United States Patent [19]

Mathis et al.

[11] Patent Number: 4,956,408

[45] Date of Patent: Sep. 11, 1990

[54] COMPLEX ACRYLATES AS STABILIZER FOR CONJUGATED DIENE/MONOVINYL AROMATIC COPOLYMERS

[75] Inventors: Ronald D. Mathis; Alonzo G. Kitchen; Frank J. Szalla, all of Bartlesville, Okla.

[73] Assignee: Phillips Petroleum Company, Bartlesville, Okla.

[21] Appl. No.: 220,105

[22] Filed: Jun. 13, 1988

[51] Int. Cl.$^5$ ................................................. C08K 5/36
[52] U.S. Cl. ...................................... 524/147; 524/151; 524/153; 524/291; 524/302; 524/303
[58] Field of Search ............... 524/291, 302, 303, 304, 524/305, 151, 153, 147

[56] References Cited

U.S. PATENT DOCUMENTS

| | | | |
|---|---|---|---|
| 2,975,160 | 5/1961 | Zelinski | 260/83.7 |
| 3,281,383 | 10/1966 | Zelinski et al. | 260/23.7 |
| 3,294,868 | 12/1966 | Pritchard | 260/876 |
| 3,629,372 | 12/1971 | Drake | 260/880 |
| 3,639,517 | 2/1972 | Kitchen et al. | 260/879 |
| 3,809,667 | 5/1974 | Coaker et al. | 260/31.8 R |
| 3,984,372 | 7/1976 | Cottman | 260/47 UA |
| 4,091,053 | 5/1978 | Kitchen | 260/880 B |
| 4,168,387 | 9/1979 | Cottman | 524/291 |
| 4,267,284 | 5/1981 | Kitchen | 525/99 |
| 4,385,143 | 5/1983 | Yachigo et al. | 524/291 |
| 4,448,915 | 5/1984 | Terada et al. | 524/93 |
| 4,584,346 | 4/1986 | Kitchen | 525/98 |
| 4,704,434 | 11/1987 | Kitchen et al. | 525/250 |
| 4,704,435 | 11/1987 | Kitchen | 525/250 |
| 4,732,923 | 3/1988 | Takata et al. | 524/291 |
| 4,774,274 | 9/1988 | Takata et al. | 524/291 |

FOREIGN PATENT DOCUMENTS 0079806 5/1983 European Pat. Off. .
59-71341 4/1984 Japan .

OTHER PUBLICATIONS

Studies on Polymer Stabilizers, Polymer Degradation and Stability, vol. 22, 1988, pp. 63-77, author Yachigo et al.

*Primary Examiner*—Veronica P. Hoke
*Attorney, Agent, or Firm*—Beverly M. Dollar

[57] ABSTRACT

A conjugated diene/monovinyl substituted aromatic hydrocarbon copolymer is stabilized by the addition of a complex acrylate, in combination with at least one of an alkyl thiopropionate, an organic phosphite and a non-acrylate substituted hindered phenolic compound.

22 Claims, No Drawings

COMPLEX ACRYLATES AS STABILIZER FOR CONJUGATED DIENE/MONOVINYL AROMATIC COPOLYMERS

BACKGROUND OF THE INVENTION

This invention relates to the thermal stabilization of conjugated diene/monovinyl substituted aromatic hydrocarbon copolymers.

Copolymers of conjugated dienes and monovinyl substituted aromatic hydrocarbons are known and useful for a variety of purposes. However, a disadvantage of these copolymers is that upon prolonged use or processing at high temperatures the copolymers undergo deterioration. It is known to add various stabilizers to the copolymers to prevent their deterioration. However, no universal stabilizer exists, and each polymer has its own stabilization problem which requires a unique solution.

In certain applications for conjugated diene/monovinyl substituted aromatic hydrocarbon copolymers a high degree of transparency in the final product is desired. As previously mentioned, thermal stability is also a desirable property; however, the additives which enhance thermal stability in the copolymer often adversely affect the degree of transparency. Moreover, many of the stabilizers as chemicals are expensive, thus there exists the need for a stabilizer that can be cheaply made or purchased or that can be used in small amounts so as to be cost effective.

The most useful stabilizers will therefore be those which provide good thermal stability to the copolymer with the addition of small amounts of stabilizer while not adversely affecting the degree of the copolymer's transparency.

SUMMARY OF THE INVENTION

It is an object of this invention to provide a method of stabilizing a conjugated diene/monovinyl substituted aromatic hydrocarbon copolymer against deterioration.

It is a further object of this invention to provide a stable conjugated diene/monovinyl substituted aromatic hydrocarbon copolymer composition.

In accordance with this invention, a conjugated diene/monovinyl substituted aromatic hydrocarbon copolymer is stabilized by the addition of a complex acrylate, in combination with at least one of: an alkyl thiopropionate, an organic phosphite and a non-acrylate substituted hindered phenolic compound.

DESCRIPTION OF THE PREFERRED EMBODIMENT

The conjugated diene/monovinyl substituted aromatic hydrocarbon copolymers generally useful in this invention are comprised of conjugated diene/monovinyl substituted aromatic hydrocarbon copolymers produced by a solution process involving sequential polymerization of a monovinyl substituted aromatic hydrocarbon and a conjugated diene in a hydrocarbon solvent at temperatures up to 250° F. Blocks of polymerized monovinyl substituted aromatic hydrocarbon are formed first, after which conjugated diene is added and subsequently polymerized. Finally, a polyfunctional treating agent can be added to form the block copolymer broadly depicted as $(A_m-D_n)_x-Y$. In this equation, A represents the polymerized monovinyl substituted aromatic hydrocarbon, D is the polymerized conjugated diene, and Y is an atom or group of atoms derived from the polyfunctional treating agent or if such treating agents are absent, Y is merely a chemical bond. The subscript x indicates the number and reactivity of the functional groups in the treating agent if present.

The first copolymer type, referred to hereafter as Copolymer I is generally comprised of a larger amount of polymerized monovinyl substituted aromatic hydrocarbon monomer than polymerized conjugated diene monomer and as such exhibits qualities of strength and rigidity whereas the second copolymer type, referred to hereafter as Copolymer II is generally comprised of a larger amount of polymerized conjugated diene monomer than polymerized monovinyl substituted aromatic hydrocarbon monomer and as such exhibits qualities of flexibility and elasticity. Copolymer I is commercially available under the trademark K-Resin ® from Phillips Petroleum Company. The basic preparation of the above mentioned copolymers is disclosed in U.S. Pat. No. 2,975,160. Preferred are resinous block copolymers produced in accordance with Nos. 3,639,517 and 3,251,905, more particular methods of preparation are disclosed in U.S. Pat. Nos. 4,584,346, 4,091,053, 4,704,434 and 4,704,435, the disclosures of which are hereby incorporated by reference.

In a preparation method typical of these publications, a conjugated diene monomer and a monovinyl substituted aromatic hydrocarbon monomer are copolymerized sequentially in the presence of an organolithium compound and a hydrocarbon solvent.

Suitable conjugated dienes or mixtures thereof which can be used in this invention include those having 4 to 12 carbon atoms per molecule, with those having 4 to 8 carbon atoms preferred. Examples of such suitable compounds include 1,3-butadiene, isoprene, 2,3-dimethyl-1,3-butadiene, piperylene, 3-butyl-1,3-octadiene, and the like. The preferred dienes are 1,3-butadiene and isoprene, most preferably 1,3-butadiene.

Suitable monovinyl substituted aromatic compounds or mixtures thereof which can be used in the copolymers include those having 8 to 18 carbon atoms per molecule. Examples of such suitable compounds include styrene, 3-methylstyrene, 4-n-propylstyrene, 4-cyclohexylstyrene, 4-decylstyrene, 2-ethyl-4-benzylstyrene, 4-p-tolylstyrene, 4-(4-phenyl-n-butyl)styrene, 1-vinylnaphthalene, 2-vinylnapthalene, and the like. Styrene is the preferred monovinyl substituted aromatic hydrocarbon.

Both copolymers, Type I or II, can be linear or branched (i.e., radial) block, tapered block, or random block copolymers.

The ratio of conjugated diene to monovinyl substituted aromatic hydrocarbon in Copolymer I is in the range of about 5:95 to about 50:50, preferably in the range of about 5:95 to about 30:70; the most preferred ratio being 24:76. The copolymer used in this invention corresponding to Copolymer I was prepared as described in U.S. No. 4,584,346. The physical properties of Copolymer I are shown in Table I.

TABLE I

| Physical Properties of Copolymer I | |
|---|---|
| 1. Butadiene/Styrene, wt. % Ratio | 24/76 |
| 2. Weight Average Molecular Weight/Number Average Molecular Weight, $M_w/M_n$ | 179,000/95,000 |
| 3. % Elongation (ASTM D638) | 100 |
| 4. Tensile Strength, psi (ASTM D638) | 4000 |
| 5. Light Transmission, % | 90–91 |

TABLE I-continued

| Physical Properties of Copolymer I | |
|---|---|
| 6. Structure | Block |

Copolymer II can contain a conjugated diene/monovinyl aromatic ratio ranging from about 51:49 to about 95:5. The copolymer useful in this invention corresponding to Copolymer II is generally described in U.S. No. 2,975,160, with a more particular preparation described in U.S. No. 3,281,383. The physical properties of Copolymer II are shown in Table II.

TABLE II

| Physical Properties of Copolymer II | |
|---|---|
| 1. Butadiene/Styrene, wt. % Ratio | 52/48 |
| 2. Weight Average Molecular Weight/Number Average Molecular Weight, $M_w/M_n$ | 101,000/57,000 |
| 3. % Elongation (ASTM D412-68) | 610 |
| 4. Tensile Strength, psi (ASTM D412-68) | 2750 |
| 5. Structure | Random-block |

The complex acrylates useful in this invention are of the formula

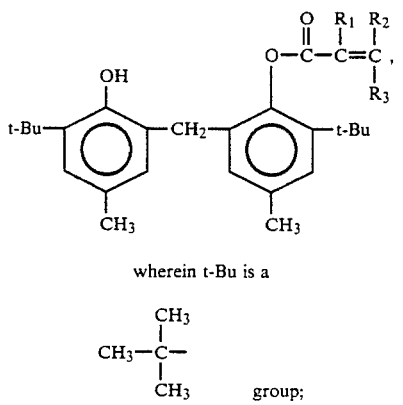

wherein t-Bu is a

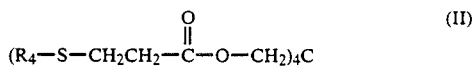

group;

and
wherein $R_1$, $R_2$ and $R_3$ are the same or different and are selected from the group consisting of hydrogen, alkyl residues having from 1 to 16 carbon atoms, aryl residues, cycloalkyl residues having from 5 to 9 carbon atoms, and alkyl substItuted aryl residues having from 7 to 12 carbon atoms; and can be said to be acrylic acid esters of a phenol. Examples of suitable complex acrylates include 2-(2-hydroxy-3-t-butyl-5-methylbenzyl)-4-methyl-6-t-butylphenyl acrylate, 2-(2-hydroxy-3-t-butyl-5-methylbenzyl)-4-methyl-6-t-butylphenyl methacrylate, 2-(3,5-di-t-butyl-4-hydroxybenzyl)-4-methylphenyl methacrylate, 2-(3,5-di-t-butyl-4-hydroxybenzyl)-4-methylphenyl acrylate, 4-(3,5-di-t-butyl-4-hydroxybenzyl)phenyl acrylate, 2-(3,5-di-t-butyl-4-hydroxybenzyl)phenyl methacrylate, 2,6-bis(2-hydroxy-3-t butyl-5-methylbenzyl)-4-methylphenyl methacrylate and the like. Presently preferred is 2-(2-hydroxy-3-t-butyl-5-methylbenzyl)-4-methyl-6-t-butylphenyl acrylate.

Any suitable amount of the complex acrylate effectIve to increase the thermal resistance of the conjugated diene/monovinyl substituted aromatic hydrocarbon copolymer can be added. The amount added will generally be in the range of about 0.05 to about 1.5 parts by weight per hundred parts by weight of the resin (phr). A preferred amount is in the range of 0.10 to about 0.50 parts per hundred parts resin (phr).

The alkyl thiopropionates useful in this invention are those according to the formula $$(R_4-S-CH_2CH_2-\overset{\overset{O}{\|}}{C}-O-CH_2)_4C \qquad (II)$$

wherein $R_4$ is an alkyl group having 4 to 20, preferably 12 to 20, carbon atoms; and can be said to be propionic acid esters of pentaerythritol. Examples of such suitable alkyl thiopropionates include pentaerythritol tetrakis(3-laurylthiopropionate), pentaerythritol tetrakis(3-stearylthiopropionate), and the like.

The alkyl thiopropionate most preferred is pentaerythritol tetrakis(3-laurylthiopropionate). When optionally employed, any suItable amount of the alkyl thiopropIonate can be added. The amount added is preferably in the range of about 0.05 to about 1.5, more preferably in the range of about 0.1 to about 1 part by weight per hundred parts by weight of resin (phr).

The organic phosphites useful in this invention are those of the formula $(RO)_3P$ wherein R is an alkyl, aryl, cycloalkyl, or combinations thereof such as arylalkyl and alkylaryl group, the radicals containing 1-15 carbon atoms. Suitable examples of such organic phosphites include tris(nonylphenyl) phosphite, diphenyl decyl phosphite, didecyl phenyl phospite, phenyl di(2-ethylhexyl) phosphite, diisooctyl phenyl phosphite, methyl diphenyl phosphite, triphenyl phosphite, tris(2,4-dimethylphenyl) phosphite, phenyl dicyclohexyl phosphite, trimethyl phosphite, diisopropyl phenyl phosphite, diethyl phenyl phosphite, di(2-ethylcyclohexyl) n-butyl phosphite, 3-cyclopentylpropyl dihexyl phosphite, and the like, or mixtures thereof. The preferred organic phosphite is tris(nonylphenyl) phosphite.

When optionally employed, any suitable amount of organic phosphite can be added. The amount added is preferably in the range of about 0.05 to about 2, more preferably in the range of about 0.1 to about 1 part by weight per hundred parts by weight of resin (phr).

The non-acrylate substituted hindered phenolic compounds useful in this invention are such as those which have in the past been employed to enhance stability in synthetic resins. Suitable examples include 2,6-di-t-butyl-4-methylphenol, n-octadecyl 3-(3,5-di-t-butyl-4-hydroxyphenyl)propionate, tetrakis[3-(3,5-di-t-butyl-4-hydroxyphenyl)propionyloxymethyl]methane, and the like. The preferred non-acrylate substituted hindered phenolic compound for use in this invention is n-octadecyl 3-(3,5-di-t-butyl-4-hydroxyphenyl)propionate.

When optionally employed, any suitable amount of the non-acrylate substituted hindered phenolic compound can be added. The amount added is preferably in the range of about 0.05 to about 0.5, more preferably about 0.1 to about 0.25 parts by weight per hundred parts by weight of resin (phr).

If employed, the alkyl thiopropionate and/or organic phosphite and/or non-acrylate substituted hindered phenolic compound can be mixed with the complex acrylate prior to their addition to the copolymer, or the compounds can be added individually to the copolymer. The stabilizers can be added to the copolymer in any manner known using conventional mixing devices such as a roll mill, plastograph or the like. In a preferred method of addition, the stabilizer compounds can be added separately or in combination to the reaction mixture in solution after the solution copolymerization has completed.

The stabilized copolymer composition can be worked into the desired shape, such as by milling, extrusion or injection molding.

It is to be understood that the copolymer compositions of this invention can contain in addition to the stabilizer or stabilizers other additives such as fillers, extenders, dyes, vulcanizing agents and accelerators, and the like.

The following examples are presented to further illustrate the invention and are not meant to limit the scope of the invention.

EXAMPLE I

This example sets out the base recipe used in all examples in the formation of the copolymers before the addition of the stabilizers. This example also demonstrates the effects of the addition of known stabilizers to the copolymers.

In the base recipe below and in the following examples, the times specified can vary ±2 minutes, the temperatures can vary ±15° F. and the pressures can vary ±10 psi without incurring adverse results. For purposes of the examples, the amount of stabilizer added is expressed in parts by weight per hundred parts by weight monomer (phm). This unit corresponds to phr when complete conversion of monomer to polymer occurs.

Base Recipe for Copolymer

The following reactants were charged to a jacketed 2-gallon stirred reactor vessel and polymerization was begun with additional reactants added at the time specified and at the reactor temperature indicated. At no time was the temperature permitted to exceed 250° F. Initially, 2.09 kg cyclohexane ($C_6$) and 0.34 g tetrahydrofuran (THF) were charged to the reactor which was being maintained at 107° F. and 20 psi. After 2 minutes 449 g styrene and 90.7 g $C_6$ were added at a reactor temperature of 116° F. Two minutes later 21.8 g of a 2.0 wt. % n-butyllithium (NBL) in $C_6$ solution followed by an additional 136.1 g $C_6$ was added at a reactor temperature of 126° F. and pressure of 26 psi. After 12 more minutes, 272 g styrene followed by 90.7 g of $C_6$ was added to the reactor which was now at 163° F. and 32 psi. Twelve minutes later there was added 88.4 g of a 2.0 wt. % NBL in $C_6$ solution followed by 90.7 g $C_6$ at a reactor temperature of 160° F. and pressure of 25 psi. After another three minutes 313 g styrene was added followed by 90.7 g $C_6$; the reactor temperature was 190° F. and the pressure was 35 psi. Sixteen minutes later, at 167° F. and 50 psi, 326 g butadiene was added followed by 90.7 g $C_6$. After an additional 20 minutes 5.4 g of Vicoilex 7170 ® (a coupling agent comprising epoxidized soybean oil sold by Viking Chemical Co. under the trade-name Vicoilex 7170 ®) dissolved in $C_6$ was added followed by 90.7 g $C_6$ at a reactor temperature of 220° F. and pressure of 50 psi. Finally 14 minutes later at the same reactor temperature and pressure, 3 cc $H_2O$ and 1.4 g $CO_2$ (350 ml pressurized to 120 psi) were added.

ADDITION OF STABILIZER

Twenty-four minutes after the $CO_2$ and $H_2O$ addition in the base recipe, $C_6$ solutions containing amounts of stabilizers corresponding to 1.0 phm tris(nonylphenyl) phosphite (TNPP) and 0.25 phm of the non-acrylate substituted hindered phenolic compound Irganox 1076 ® (an antioxidant sold by Ciba Geigy Co. comprising n-octadecyl 3-(3,5-di-t-butyl-4-hydroxyphenyl)-propionate) were added to the copolymer solution in the reactor at reactor conditions of 220° F. and 110 psi. After 10 minutes a sample was removed and the solvent was evaporated resulting in a polymer crumb. The polymer crumb was then vacuum oven dried at 212° F. for 2 hours and thereafter tested as explained hereinbelow.

The polymer crumb from above (and from each of the Examples following) was tested in a melt index apparatus at 250° C. with an applied weight of 5kg according to the general procedure described in ASTM D1238-84. The melt flow at 5 minutes was compared to the melt flow at 30, 40, and 60 minutes (unless otherwise specified) and the percent change determined. While not wishing to be bound by theory, it is believed that a melt flow drop off (DO) is caused by undesirable crosslinking while melt flow increase (IN) is believed to be caused by the more desirable visbreaking.

The copolymer as stabilized above with TNPP and Irganox 1076 ® when tested by the melt flow test described above had a 12% melt flow DO after 30 minutes, 28% DO after 40 minutes, and 64% DO after 60 minutes. Results are shown in Table 111. The melt index drop off of 64% after 60 minutes is undesirably high.

EXAMPLE II

This Example again demonstrates the use of known stabilizers. The last two additions in the base recipe were varied in that the $CO_2$ was added at reactor conditions of 220° F. and 85 psi 8 minutes after the $H_2O$ was added. Nine minutes after the $CO_2$ addition, a cyclohexane solution containing TNPP and Irganox 1076 ® corresponding to 1.0 phm TNPP and 0.25 phm Irganox 1076 ® respectively, was added to the copolymer solution which was being maintained in the reactor at 220° F. and 100 psi. After 14 additional minutes a sample was removed, and the solvent was evaporated. The resulting polymer crumb was vacuum oven dried and tested as explained above. The results are shown in Table III. As can be seen, 60 minute melt index drop off was 57% which is also undesirably high.

EXAMPLE III

This Example illustrates the beneficial effect on resin stability achieved by use of the invention stabilizer 2-(2-hydroxy-3-t-butyl-5-methylbenzyl)-4-methyl-6-t-butylphenyl acrylate.

The base recipe was varied slightly in that the $CO_2$ was added at a reactor temperature of 221° F. and a reactor pressure of 75 psi 9 minutes after the $H_2O$ addition. Four minutes after the $CO_2$ addition, 0.3 phm of 2-(2-hydroxy-3-t-butyl-5-methylbenzyl)-4-methyl-6-t-butylphenyl acrylate (an antioxidant available from Sumitomo Chemical Co. under the tradename Sumilizer ® GM) dissolved in $C_6$ was added to the copolymer solution in the reactor which was at 217° F. and 100 psi. Ten minutes later a sample was taken and the solvent was evaporated, resulting in a polymer crumb. The polymer crumb was dried and tested as explained heretobefore. Results are shown in Table III herein. As can be seen by the 1 percent melt index drop off after 60 minutes, excellent stability was obtained.

EXAMPLE IV

This Example illustrates the use of the invention stabilizer system comprising Sumilizer ® GM and TNPP.

The base recipe was varied in that the $CO_2$ was added 16 minutes after the $H_2O$ and at a reactor temperature of 221° F. and pressure of 70 psi. Nine minutes after the addition of the $CO_2$, 1.0 phm of TNPP dissolved in $C_6$ and 0.5 phm of Sumilizer ® GM dissolved in a toluene/THF mixture were added to the copolymer solution in the reactor.

After the addition of the stabilizer system, the solvent was removed by flashing at 340° F. to recover the polymer crumb, which was then dried and tested as explained heretobefore. Results are shown in Table III herein. Here melt index drop off was totally eliminated and the modest melt index increase is indicating excellent stability.

EXAMPLE V

This Example again illustrates the invention stabilizer system comprising Sumilizer ® GM and TNPP.

For this example 0.1 phm Sumilizer ® GM dissolved in 15 cc $C_6$ and 1.0 phm TNPP dissolved in $C_6$ were added to the copolymer solution in the reactor 22 minutes after the last addition in the base recipe. The reactor temperature was 220° F. and the pressure was 100 psi. After 10 minutes a sample was taken and the solvent evaporated. The resulting polymer crumb was dried and tested as explained heretobefore. Results are shown in Table III herein. This and the subsequent examples VI–X all show the good stability achieved by the complex acrylate alone or in combination with a phosphite or non-acrylate substituted hindered phenolic compound.

EXAMPLE VI

This Example further illustrates the invention stabilizer system comprising Sumilizer ® GM and TNPP.

For this Example 0.25 phm of Sumilizer ® GM dissolved in a toluene/THF mixture and 1.0 phm of TNPP dissolved in $C_6$ were added to the copolymer solution in the reactor 18 minutes after the last addition in the base recipe. The solvent was evaporated and the resulting polymer crumb was dried and tested as explained heretobefore. Results are shown in Table III herein.

EXAMPLE VII

This Example illustrates the use of the invention stabilizer system comprising Sumilizer ® GM and pentaerythritol tetrakis(3-laurylthiopropionate) (available from Sumitomo Chemical Co. under the trade-name Sumilizer ® TP-D).

The base recipe of Example I was varied in that the $CO_2$ addition was made at 220° F. and 80 psi 14 minutes after the addition of the $H_2O$. Eleven minutes later, 0.15 phm of Sumilizer ® GM dissolved in $C_6$ and 0.15 phm of Sumilizer ® TP-D dissolved in $C_6$ were added at 217° F. and 100 psi to the copolymer solution in the reactor. After 10 more minutes a sample was removed and the solvent was evaporated. The resulting polymer crumb was tested as explained heretobefore and the results are given in Table III herein.

EXAMPLE VIII

This Example again illustrates the use of the invention stabilizer system comprising Sumilizer ® GM and Sumilizer ® TP-D.

The base recipe was again varied by adding the $CO_2$ at 214° F. and 80 psi 8 minutes after the $H_2O$ addition. Thirteen minutes thereafter, 0.50 phm Sumilizer ® GM dissolved in $C_6$ and 1.0 p TP-D dissolved in $C_6$ were added to the copolymer solution in the reactor which was at 200° F. and 100 psi. The sample was heated to 340° F. and the solvent flashed off. The resulting polymer crumb was dried and tested as explained heretobefore. The results are set out below in Table III.

EXAMPLE IX

This Example further illustrates the use of the invention stabilizer system comprising Sumulizer ® GM and Sumilizer ® TP-D.

Example VIII was repeated with the exception that the amounts of Sumilizer ® GM and Sumilizer ® TP-D added to the copolymer were both at a level of 0.50 phm. Results are shown in Table III below.

EXAMPLE X

This Example illustrates the use of the trinary invention stabilizer system comprising Sumilizer ® GM, TNPP and Irganox 1076 ®.

Seventeen minutes after the last addition of the base recipe 0.05 phm Sumilizer ® GM dissolved in $C_6$ was added to the copolymer solution in the reactor which was at 222° F. and 60 psi. Two minutes later, 0.25 phm Irganox and 1.0 phm TNPP dissolved in $C_6$ were added at 221° F. and 80 psi. The solvent was evaporated by flashing at 350° F. and the resulting polymer crumb was dried and tested as explained heretobefore. Results are shown in Table III below.

TABLE III

| Example No. | Irganox 1076 ® (phm) | TNPP (phm) | Sumilizer ® GM (phm) | Sumilizer ® TP-D (phm) | Percent Melt Flow Change at 250° C. 5 Minutes vs. 30 min. | 40 min. | 60 min. |
|---|---|---|---|---|---|---|---|
| I | 0.25 | 1.0 | — | — | 12 DO[a] | 28 DO | 64 DO |
| II | 0.25 | 1.0 | — | — | 10 DO | 20 DO | 57 DO |
| III | — | — | 0.30 | — | 17 IN[b] | 14 IN | 1 IN |
| IV | — | 1.0 | 0.50 | — | 24 IN | 22 IN | 17 IN |
| V | — | 1.0 | 0.10 | — | 7 IN | 5 IN | 14 DO |
| VI | — | 1.0 | 0.25 | — | 18 IN | 15 IN | 6 IN |
| VII | — | — | 0.15 | 0.15 | 13 IN | 2 DO | 3 DO |
| VIII | — | — | 0.50 | 1.0 | 24 IN | 26 IN | 16 IN |
| IX | — | — | 0.50 | 0.50 | 17 IN | 14 IN | 1 DO |
| X | 0.25 | 1.0 | 0.05 | — | 11 IN | 8 IN | 11 DO |

[a]DO = Melt Flow Drop Off
[b]IN = Melt Flow Increase

As can be seen from Table III, use of the invention stabilizer Sumilizer ® GM alone affects stability of the polymer favorably compared to polymers with known stabilizers (Example III vs. Examples I and II). Percent change in melt flow is less with the use of the Sumilizer ® GM and is characterized by increase in melt flow indicating more desirable visbreaking instead of a drop off in melt flow indicating undesirable crosslinking. Note also that smaller amounts of Sumilizer® GM incorporated in the polymer with amounts of TNPP and Sumilizer® TP-D are effective in stabilizing the copolymer (Examples VI, and VII). Trinary combinations with the GM present in small amounts also are effective in enhancing copolymer stability (Example X) and greatly enhance the stabilizing effectiveness of known stabilizers (Example X vs. I and II).

Several of the stabilized copolymers were also tested for color stability after aging for a specific number of weeks at a specific temperature.

The polymer crumb (with stabilizers incorporated) from Examples I, III, IV, VII and VIII were each separately placed in a Brabender Plasticorder Model PL-V151 (from Brabender, South Hackensack, N.J.) at 185° C. for approximately 1 minute in order to form a molten slab of polymer which was then allowed to solidify. The solid slabs were then cut and compression molded at 350° F. for 3 minutes under 20 tons pressure (hydraulic press from Pasadena Hydraulic, City of Industry, Calif.) to form 21 g, 2½" diameter×¼" thick discs. A wire was attached to the edge of each disc and the various discs were suspended in a forced air oven (from Blue M Electric Co., Blue Island, Ill.), for up to 6 weeks at 70° C. or up to 5 weeks at 90° C. The color tests were run using a Hunter Lab Colormeter Model D 25 Optical Sensor, (from Hunter Associate Laboratories, Inc., Fairfax, Va.). The Colormeter reports 3 values, L, a, b. The L value represents the lightness or darkness of the sample; the number L=100 corresponds to white and the number L=0 corresponds to black. The +a value represents a red color, −a values represent green. The +b value represents a yellow tinge to the polymer, −b values represent a blue tinge. The Hunter Lab Colormeter also was used to measure the yellowness index (YI) which is another method of indicated the yellowing of a sample upon aging; the lower the YI number, the less yellow the polymer.

Results of the color stability tests for the stabilized copolymers from Examples I, III, IV, VII and VIII are shown in Table IV.

TABLE IV

|  |  | Control | Inventions | | | |
|---|---|---|---|---|---|---|
|  |  | Example I | Example VII | Example III | Example IV | Example VIII |
| Irganox 1076 ®, phm | | 0.25 | — | — | — | — |
| TNPP, phm | | 1.00 | — | — | 1.0 | — |
| Sumilizer ® GM, phm | | — | 0.15 | 0.30 | 0.50 | 0.50 |
| Sumilizer ® TP-D, phm | | — | 0.15 | — | — | 1.00 |
| Aging, weeks | | Color Stability at 70° C. | | | | |
| 0 | L | 86.4 | 87.1 | 87.3 | 86.6 | 87.1 |
|  | a | −1.2 | −1.2 | −1.3 | −1.3 | −1.2 |
|  | b | 3.0 | 2.5 | 2.4 | 2.8 | 2.4 |
|  | YI | 5.5 | 4.3 | 4.2 | 5.0 | 4.3 |
| 1 | L | 85.8 | 86.7 | 87.0 | 86.1 | 86.4 |
|  | a | −1.3 | −1.3 | −1.4 | −1.3 | −1.3 |
|  | b | 3.2 | 2.8 | 2.9 | 2.9 | 2.9 |
|  | YI | 5.9 | 4.9 | 5.0 | 5.3 | 5.3 |
| 2 | L | 86.2 | 86.8 | 86.6 | 86.3 | 86.7 |
|  | a | −1.4 | −1.4 | −2.2 | −1.5 | −1.4 |
|  | b | 3.1 | 2.7 | 5.7 | 3.1 | 2.9 |
|  | YI | 5.6 | 4.8 | 10.3 | 5.6 | 5.1 |
| 3 | L | 86.1 | 86.9 | 86.4 | 86.4 | 86.6 |
|  | a | −1.3 | −1.4 | −2.8 | −1.4 | −1.3 |
|  | b | 3.5 | 2.9 | 8.3 | 3.5 | 3.4 |
|  | YI | 6.5 | 5.2 | 15.1 | 6.4 | 6.3 |
| 4 | L | 86.2 | 86.9 | 86.6 | 86.4 | 86.6 |
|  | a | −1.3 | −1.4 | −2.9 | −1.3 | −1.3 |
|  | b | 3.6 | 2.9 | 8.1 | 3.6 | 3.4 |
|  | YI | 6.7 | 5.2 | 14.6 | 6.5 | 6.3 |
| 5 | L | 86.2 | 86.7 | 86.5 | 86.3 | 86.5 |
|  | a | −1.3 | −1.4 | −3.0 | −1.3 | −1.1 |
|  | b | 3.5 | 3.0 | 7.8 | 3.4 | 3. |
|  | YI | 6.6 | 5.3 | 14.0 | 6.2 | 5.9 |
| 6 | L | 86.2 | 86.8 | 86.5 | 86.1 | 86.4 |
|  | a | −1.3 | −1.3 | −3.1 | −1.3 | −1.1 |
|  | b | 3.5 | 3.0 | 8.1 | 3.2 | 3.0 |
|  | YI | 6.5 | 5.4 | 14.5 | 6.0 | 5.6 |
| Aging, weeks | | Color Stability at 90° C. | | | | |
| 0 | L | 86.4 | 87.1 | 87.3 | 86.6 | 87.1 |
|  | a | −1.2 | −1.2 | −1.3 | −1.3 | −1.2 |
|  | b | 3.0 | 2.5 | 2.4 | 2.8 | 2.4 |
|  | YI | 5.5 | 4.3 | 4.2 | 5.0 | 4.3 |
| 1 | L | 86.1 | 86.7 | 86.8 | 86.3 | 86.3 |
|  | a | −1.3 | −1.3 | −1.4 | −1.3 | −1.3 |
|  | b | 3.3 | 2.8 | 3.2 | 3.0 | 3.0 |
|  | YI | 5.4 | 4.7 | 5.4 | 5.0 | 4.9 |
| 2 | L | 86.4 | 86.8 | 86.6 | 86.6 | 86.6 |
|  | a | −1.4 | −1.4 | −2.5 | −1.4 | −1.4 |
|  | b | 3.2 | 2.7 | 7.0 | 2.9 | 2.9 |
|  | YI | 5.7 | 4.7 | 12.6 | 5.2 | 5.1 |
| 3 | L | 86.4 | 86.9 | 86.3 | 86.6 | 86.6 |
|  | a | −1.4 | −1.4 | −2.9 | −1.4 | −1.4 |
|  | b | 3.5 | 2.8 | 8.5 | 3.2 | 3.3 |
|  | YI | 6.4 | 5.0 | 15.6 | 5.8 | 5.9 |
| 4 | L | 86.3 | 86.9 | 86.5 | 86.4 | 86.5 |
|  | a | −1.4 | −1.4 | −3.0 | −1.3 | −1.3 |

TABLE IV-continued

|   | | Control | Inventions | | | |
|---|---|---|---|---|---|---|
|   | | Example I | Example VII | Example III | Example IV | Example VIII |
|   | b | 3.8 | 2.9 | 7.9 | 3.4 | 3.3 |
|   | YI | 6.9 | 5.0 | 14.2 | 6.2 | 6.1 |
| 5 | L | 86.1 | 86.8 | 86.4 | 86.2 | 86.3 |
|   | a | −1.3 | −1.4 | −3.1 | −1.3 | −1.2 |
|   | b | 3.8 | 3.1 | 8.3 | 3.4 | 3.3 |
|   | YI | 7.1 | 5.4 | 14.8 | 6.3 | 6.2 |

A polymer with good color stability should exhibit higher L values (closer to 100), a values close to 0, b values close to 0, and low YI values. Table IV demonstrates that the polymers stabilized with the invention stabilizer or stabilizer systems (Example VII, Example III, Example IV and Example VIII) generally gave higher L values, lower YI values and a and b values closer to 0 than the polymer with known stabilizers added (Example I). While the polymer with 0.3 phm of the invention stabilizer exhibited good clarity initially, it evidenced some yellowing after aging (Example III); however this copolymer exhibited good thermal stability (Table III, Example III). The stabilizer system which appeared to give the best color stability upon aging at elevated temperatures was the invention stabilizer system comprising Sumilizer ® GM and Sumilizer ® TP-D. Values for all four color variables for this system appeared to remain most nearly the same throughout the tests.

While this invention has been described in detail for the purpose of illustration, it is not to be construed as limited thereby, but is intended to cover all changes and modifications within the spirit and scope thereof.

That which is claimed is:

1. A method for stabilizing a polymeric composition comprising a conjugated diene/monovinyl substituted aromatic hydrocarbon copolymer wherein said copolymer is selected from the group consisting of linear or branched block, tapered block or random block copolymers, wherein the weight ratio of conjugated diene to monovinyl substituted aromatic hydrocarbon in said copolymer is in the range of about 5:95 to about 50:50, which method comprises:

incorporating in said copolymer effective amounts of a complex acrylate of the formula

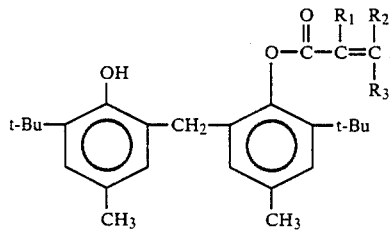

wherein t-Bu is a

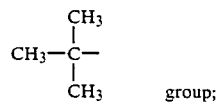
group;

and $R_1$, $R_2$ and $R_3$ are the same or different and are selected from the group consisting of hydrogen, alkyl residues having from 1 to 16 carbon atoms, aryl residues, cycloalkyl residues having from 5 to 9 carbon atoms, and alkyl substituted aryl residues having from 7 to 12 carbon atoms; and an organic phosphite of the formula $(RO)_3P$; and a non-acrylate substituted hindered phenolic compound.

2. A method in accordance with claim 1 wherein the conjugated diene is butadiene and the monovinyl substituted aromatic hydrocarbon is styrene and wherein the weight ratio of said butadiene to said styrene in said copolymer is about 24:76.

3. A method in accordance with claim 1 wherein said complex acrylate is incorporated in an amount in the range of about 0.05 to about 1.5 phr.

4. A method in accordance with claim 1 wherein said complex acrylate is 2-(2-hydroxy-3-t-butyl-5-methylbenzyl)-4-methyl-6-t-butyl phenyl acrylate.

5. A method for stabilizing a polymeric composition comprising a conjugated diene/monovinyl substituted aromatic hydrocarbon copolymer wherein said copolymer is selected from the group consisting of linear or branched block, tapered block or random block copolymers, wherein the weight ratio of conjugated diene to monovinyl substituted aromatic hydrocarbon in said copolymer is in the range of about 5:95 to about 50:50, which method comprises:

incorporating in said copolymer effective amounts of a complex acrylate of the formula

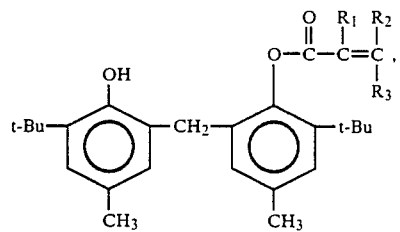

wherein t-Bu is a

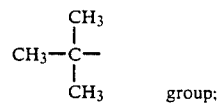
group;

and $R_1$, $R_2$ and $R_3$ are the same or different and are selected from the group consisting of hydrogen, alkyl residues having from 1 to 16 carbon atoms, aryl residues, cycloalkyl residues having from 5 to 9 carbon atoms, and alkyl substituted aryl residues having from 7 to 12 carbon atoms; and an alkyl thiopropionate of the formula wherein $R_4$ is an alkyl group having 4–20 carbon atoms.

6. A method in accordance with claim 5 wherein said alkyl thiopropionate is present in an amount in the range of about 0.05 to about 1.5 phr.

7. A method in accordance with claim 6 wherein said alkylthiopropionate is pentaerythritol tetrakis(3-lauryl-thiopropionate).

8. A method in accordance with claim 1 wherein said organic phosphite is present in an amount in the range of about 0.05 to about 2.0 phr.

9. A method in accordance with claim 1 wherein said non-acrylate substituted hindered phenolic compound is present in an amount in the range of about 0.05 to about 0.5 phr.

10. A method in accordance with claim 8 wherein said organic phosphite is tris(nonylphenyl) phosphite.

11. A method in accordance with claim 9 wherein said non-acrylate substituted hindered phenolic compound is n-octadecyl 3-(3,5-di-t-butyl-4-hydroxyphenyl)propionate.

12. A method for stabilizing a polymeric composition comprising a butadiene/styrene copolymer wherein said copolymer is selected from the group consisting of linear or branched block, tapered block or random block copolymers, wherein the weight ratio of butadiene to styrene is about 24:76, which comprises incorporating in said copolymer an amount in the range of from 0.05 to about 1.5 phr of 2-(2-hydroxy-3-t-butyl-5-methylbenzyl)-4-methyl-6-t-butyl phenyl acrylate, an amount in the range of 0.05 to 2.0 phr of tris(nonylphenyl) phosphite, and an amount in the range of 0.05–0.5 phr of a compound selected from the group consisting of n-octadecyl-3-(3,5-di-t-butyl-4-hydroxyphenyl)propionate, and tetrakis[3-(3,5-di-t-butyl-4-hydroxyphenyl) propionyloxymethyl] methane.

13. A composition of matter consisting essentially of an intimate mixture of a conjugated diene/monovinyl substituted aromatic hydrocarbon copolymer wherein said copolymer is selected from the group consisting of linear or branched block, tapered block or random block copolymers, wherein the weight ratio of conjugated diene to monovinyl substituted aromatic hydrocarbon in said copolymer is in the range of about 5:95 to about 50:50; a complex acrylate of the formula

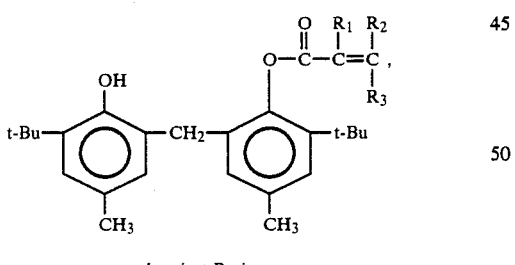

wherein t-Bu is a

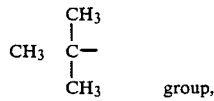 group, and $R_1$, $R_2$ and $R_3$ are the same or different and are selected from the group consisting of hydrogen, alkyl residues having from 1 to 16 carbon atoms, aryl residues, cycloalkyl residues having from 5 to 9 carbon atoms, and alkyl substituted aryl residues having from 7 to 12 carbon atoms, and wherein said acrylate is present in an amount in the range of about 0.05 to about 1.5 phr; an organic phosphite, wherein said organic phosphite is present in an amount in the range of about 0.05 to about 2.0 phr; and a non-acrylate substitute hindered phenolic compound, wherein said non-acrylate substituted hindered phenolic compound is present in an amount in the range of about 0.05 to about 0.5 phr.

14. A composition in accordance with claim 13 wherein said conjugated diene is butadiene and said monovinyl substituted aromatic hydrocarbon is styrene and wherein the weight ratio of said butadiene to said styrene in said copolymer is in the range of about 5:95 to about 50:50.

15. A composition in accordance with claim 13 wherein said complex acrylate is 2-(2-hydroxy-3-t-butyl-5-methylbenzyl)4-methyl-6-t-butylphenyl acrylate.

16. A composition in accordance with claim 13 wherein said phosphite is tris(nonylphenyl)phosphite.

17. A composition in accordance with claim 13 wherein said non-acrylate substituted hindered phenolic compound is selected from the group consisting of n-octadecyl 3-(3,5-di-t-butyl-4-hydroxyphenyl)propionate and tetrakis[3-(3,5-di-t-butyl-4-hydroxyphenyl) propionyloxymethyl]methane.

18. A composition of matter consisting essentially of an intimate mixture of a conjugated diene/monovinyl substituted aromatic hydrocarbon copolymer wherein said copolymer is selected from the group consisting of linear or branched block, tapered block or random block copolymers, wherein the weight ratio of conjugated diene to monovinyl substituted aromatic hydrocarbon in said copolymer is in the range of bout 5:95 to about 50:50; a complex acrylate of the formula

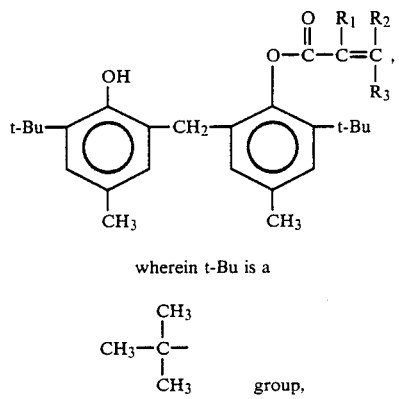

wherein t-Bu is a $$\begin{array}{c} CH_3 \\ | \\ CH_3-C- \\ | \\ CH_3 \end{array} \text{ group,}$$

and $R_1$, $R_2$ and $R_3$ are the same or different and are selected from the group consisting of hydrogen, alkyl residues having from 1 to 16 carbon atoms, aryl residues, cycloalkyl residues having from 5 to 9 carbon atoms, and alkyl substituted aryl residues having from 7 to 12 carbon atoms, and wherein said acrylate is present in an amount in the range of about 0.05 to about 1.5 phr; and an alkyl thiopropionate of the formula

wherein $R_4$ is an alkyl group having 4–20 carbon atoms.

19. A composition in accordance with claim 18 wherein said alkyl thiopropionate is present in an amount in the range of about 0.05 to about 1.5 phr.

20. A composition in accordance with claim 19 wherein said alkyl thiopropionate is pentaerythritol tetrakis(3-laurylthiopropionate).

21. A composition comprising an intimate mixture of a butadiene/styrene copolymer wherein said copolymer is selected from the group consisting of linear or branched block, tapered block or random block copolymers, wherein the weight ratio of butadiene to styrene is about 24:76, and 2-(2-hydroxy-3-t-butyl-5-methylbenzyl)-4-methyl-6-t-butylphenyl acrylate in an amount in the range of about 0.05 to about 1.5 phr, and pentaerythritol tetrakis(3-laurylthiopropionate) in an amount in the range of about 0.05 to about 1.5 phr.

22. A composition comprising an intimate mixture of a butadiene/styrene copolymer wherein said copolymer is selected from the group consisting of linear or branched block, tapered block or random block copolymers, wherein the weight ratio of butadiene to styrene is about 24:76, and 2-(2-hydroxy-3-t-butyl-5-methylbenzyl)-4-methyl-6-t-butylphenyl acrylate in an amount in the range of about 0.05 to about 1.5 phr, and n-octadecyl 3-(3,5-di-t-butyl-4-hydroxyphenyl)propionate in an amount in the range of about 0.05 to about 0.5 phr, and tris(nonylphenyl) phosphite in an amount in the range of about 0.05 to about 2.0 phr.

* * * * *

UNITED STATES PATENT AND TRADEMARK OFFICE
CERTIFICATE OF CORRECTION

PATENT NO. : U.S. 4,956,408

DATED : September 11, 1990

INVENTOR(S) : Ronald D. Mathis et al

It is certified that error appears in the above-identified patent and that said Letters Patent is hereby corrected as shown below:

Column 11, claim 1, line 63, after "group;" insert --- and ---; and
line 65, delete the first occurrence of "and".

Column 12, claim 5, line 59, after "group;" insert --- and ---;
line 60, delete the first occurrence of "and"; and
line 67, please insert the following formula, Column 13, claim 13, line 59, after "group," insert --- and ---;
line 61, delete the first occurrence of "and".

Column 14, claim 18, line 33, delete "bout" insert --- about ---;
line 52, after "group," insert --- and ---; and
line 53, delete the first occurrence of "and".

Signed and Sealed this

Fourth Day of August, 1992

Attest:

DOUGLAS B. COMER

*Attesting Officer*   *Acting Commissioner of Patents and Trademarks*